(12) United States Patent
Turcanu

(10) Patent No.: US 8,331,971 B2
(45) Date of Patent: Dec. 11, 2012

(54) GROUP CALL IN A COMMUNICATIONS SYSTEM

(75) Inventor: Calin Turcanu, Helsinki (FI)

(73) Assignee: Nokia Corporation, Espoo (FI)

( * ) Notice: Subject to any disclaimer, the term of this patent is extended or adjusted under 35 U.S.C. 154(b) by 165 days.

(21) Appl. No.: 10/560,109

(22) PCT Filed: Jun. 8, 2004

(86) PCT No.: PCT/FI2004/000349
§ 371 (c)(1),
(2), (4) Date: Jan. 17, 2006

(87) PCT Pub. No.: WO2004/114643
PCT Pub. Date: Dec. 29, 2004

(65) Prior Publication Data
US 2006/0128411 A1     Jun. 15, 2006

(30) Foreign Application Priority Data

Jun. 25, 2003   (FI) .................................... 20030944

(51) Int. Cl.
*H04B 7/00* (2006.01)
(52) U.S. Cl. .................... 455/518; 455/519; 455/416
(58) Field of Classification Search .............. 455/416, 455/518–519; 370/260; 379/116, 121.04, 379/121.05, 126, 133, 266.1
See application file for complete search history.

(56) References Cited

U.S. PATENT DOCUMENTS

| | | | | |
|---|---|---|---|---|
| 5,394,463 A * | 2/1995 | Fischell et al. | ........... | 379/211.02 |
| 6,128,381 A | 10/2000 | Holmstrom et al. | | |
| 6,577,622 B1 | 6/2003 | Schuster et al. | | |
| 2002/0078153 A1 | 6/2002 | Chung et al. | | |
| 2002/0150091 A1* | 10/2002 | Lopponen et al. | ............ | 370/389 |
| 2003/0105820 A1* | 6/2003 | Haims et al. | ................. | 709/205 |
| 2003/0119540 A1* | 6/2003 | Mathis | ......................... | 455/518 |
| 2003/0152040 A1 | 8/2003 | Crockett et al. | | |
| 2003/0153343 A1 | 8/2003 | Crockett et al. | | |
| 2004/0015547 A1* | 1/2004 | Griffin et al. | ................. | 709/206 |
| 2004/0015553 A1* | 1/2004 | Griffin et al. | ................. | 709/206 |
| 2004/0114643 A1 | 6/2004 | Payne et al. | | |

FOREIGN PATENT DOCUMENTS

| | | |
|---|---|---|
| EP | 0954156 A3 | 8/2001 |
| WO | WO 00/38400 | 6/2000 |
| WO | WO 02/087204 | 10/2002 |
| WO | WO 03/055188 | 7/2003 |

* cited by examiner

*Primary Examiner* — Kamran Afshar
*Assistant Examiner* — Dung Lam
(74) *Attorney, Agent, or Firm* — Ditthavong Mori & Steiner, P.C.

(57) ABSTRACT

The present invention relates to an ad-hoc group call made from a subscriber device of a communications system. A list of subscribers is stored in a phonebook application in a subscriber device. A user can activate a group call and select two or more subscribers from the phonebook. In response to such selection, the subscriber device provides appropriate signalling with a group communication service in a network infrastructure for establishing an ad-hoc group call consisting of the selected subscribers and the user of the subscriber device. The ad-hoc group is deleted when the call ends.

17 Claims, 4 Drawing Sheets

GROUP CALL IN A COMMUNICATIONS SYSTEM

FIELD OF THE INVENTION

The invention relates to communications systems, and especially to group communication in communications systems.

BACKGROUND OF THE INVENTION

One special feature offered by mobile communications systems is group communication. Conventionally group communication has been available in trunked mobile communications systems, such as Professional Mobile Radio or Private Mobile Radio (PMR) systems, which are special radio systems primarily intended for professional and governmental users, such as the police, military forces and oil plants. However, the group communication is now becoming available also in public mobile communications systems. The term "group", as used herein, refers to any logical group of three or more users for participating in the same group communication, e.g. a speech call. The same user may be a member of more than one communication group. Typically, the members of the communication group belong to the same organization, such as the police, the fire brigade, a private company, etc. Also, typically, the same organization has several separate groups, i.e. a set of groups. Even private persons might want to have talk groups, such as hobby groups, sport groups, etc.

Generally, in group voice communication with a "push-to-talk, release-to-listen" feature, a group call is based on the use of a pressel (PTT, push-to-talk switch) in a telephone as a switch: by pressing a PTT the user indicates his desire to speak, and the user equipment sends a service request to the network. Alternatively, a voice activity detector (VAD) can be used instead of the manual switch. The network either rejects the request or allocates the requested resources on the basis of predetermined criteria, such as the availability of resources, priority of the requesting user, etc. At the same time, a connection is established also to all other active users in the specific subscriber group. After the voice connection has been established, the requesting user can talk and the other users can listen on the channel. When the user releases the PTT, the user equipment signals a release message to the network, and the resources are released. Thus, the resources are reserved only for the actual speech transaction or speech item, instead of reserving the resources for a "call". One interesting advantage of push-to-talk communication, or more generally speech-item-by-speech-item communication, is a short call setup time, which also makes such speech communication attractive to several other types of users. U.S. Pat. No. 6,141,347 discloses a wireless communications system which uses multicast addressing and decentralized processing in group calls.

The group communication is now becoming available also in public mobile communications systems. New packet-based group voice and data services are being developed for cellular networks, especially in the GSM/GPRS/UMTS network evolution. In some approaches, the group communication service, and also one-to-one communication, is provided as a packet-based user or application level service so that the underlying communications system only provides the basic connections (i.e. IP connections) between the group communications applications in the user terminals and the group communication service. The group communication service can be provided by a group communication server system while the group client applications reside in the user equipment or terminals. Examples of this approach are disclosed in co-pending U.S. patent application Ser. Nos. 09/835,867; 09/903,871; 10/160,272; and 09/903,871; and in WO 02/085051. When this approach is employed for push-to-talk communication, the concept is also referred to as push-to-talk over a cellular (PoC) network.

Group communication has conventionally been based on predefined and rather static groups. In the first generation of PMR systems, information on group membership was stored only in mobile stations. In more recent systems, the information on group membership is stored both in the system and in the mobiles. The latter case provides many functional advantages (such as allowing the system to allocate resources only when actually required by a group member) but makes the dynamic regrouping technically more demanding and complex. The information in the system and the mobiles must match with one another. This is usually achieved by arranging the radio system to keep a master copy of the group information. This works well as long as it is enough to perform group management from a fixed terminal connected to the network infrastructure.

Various ways have existed for a long time to create new talk groups and/or to modify group membership more dynamically. A particular need has arisen to create and manage groups from mobiles. The groups should often be created spontaneously for temporary use. Such temporary and dynamic 3 groups are often called ad-hoc groups. Thus, for a good end-user experience regarding ad-hoc group call, a group call service in a mobile terminal and an infrastructure should offer an easy mechanism to form groups that have a short life and an easy-to-make group call.

Co-pending U.S. patent application Ser. No. 09/985,169 titled "A method for creating a dynamic talk group" and having the same assignee as the present application, discloses a method wherein group creation and membership management are handled at user level without interacting with the system. The role of the system is restricted to establishing a means for communicating with the group whenever there are users who have activated the communication group. A user creates a new dynamic group by defining a group definition message in his subscriber station. This group definition message uniquely identifies the new group in the system, and can be distributed to the intended group members using the common messaging facilities available in the specific communications system (such as SMS in a GSM network). The recipients of the group definition message can store the message in their subscriber stations for subsequent use. This prior art approach is, however, rather complicated for ad-hoc calls.

SUMMARY OF THE INVENTION

An object of the invention is a new and an easy-to-use method for forming an ad-hoc group and making an ad-hoc group call.

This and other objects and advantages of the present invention are achieved by methods and inventions according to the attached independent claims. Various embodiments of the invention are disclosed in the dependent claims.

The present invention avoids the complicated prior art procedures and provides an easy-to-use mechanism integrated into a phonebook application for generating ad-hoc group calls and selecting the subscribers that will take part in an ad-hoc group call. Thereby, the present invention enhances the usability of group call services in user terminals and public communications systems communication from a phonebook application in a user terminal. In a further embodiment of the invention also presence information of other subscribers is available in the phonebook application.

BRIEF DESCRIPTION OF THE DRAWINGS

In the following the invention will be described in greater detail by means of exemplary embodiments and with reference to the accompanying drawings, in which.

DETAILED DESCRIPTION

The present invention is applicable to any communication system allowing group communication. The communication may include data communication, audio communication, video communication, multimedia communication, messaging, such as short messaging, electronic mail, etc. The implementation of the user equipment and the system entities providing the group communication service, such as a server in a network, may vary according to the specific communications system that the present invention is applied to.

Mobile communication systems are accepted to be the primary field of application for the present invention. The present invention is especially suitable for packet-based group communication in mobile communication systems. In the following, embodiments of the invention will be described as implemented in mobile packet radio communication systems, such as the GPRS (General Packet Radio Service) or the UMTS (Universal Mobile Telecommunication System), and utilizing the presence service as an example of an information service providing information on users, without limiting the invention to these communication systems and presence services.

Figure 1:
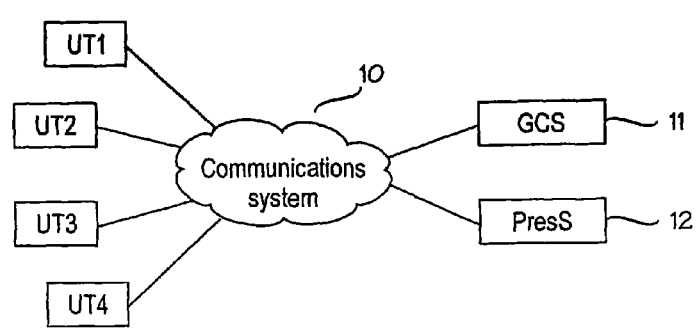
FIG. 1 illustrates general architecture of an exemplary communication system having group communication service (GCS) functionality.

General architecture of an exemplary communication system having a group communication service (GCS) functionality with an optional presence information service functionality is illustrated in FIG. 1. The group communication service (GCS) may be integrated into the switching and connection set up or call control functionalities of the communication system 10, for example in the manner group calls are implemented in the conventional trunked radio or PMR systems, such as TETRA (terrestrial trunked radio). Alternatively, the group communication service (GCS) may be a user or application level service so that the underlying communications system only provides the basic connections (i.e. IP connections) between the applications in the user terminals UT1-UT4 and the group communication service (GCS). In the latter approach, the group communication service (GCS) may be provided by a group communication server while the client applications reside in the user equipment or terminals. The service may also be implemented with a combination of the two approaches.

The presence service (PresS) functionality may be provided on the infrastructure side by means of a presence server 12 while the presence client applications reside in the user terminals. The presence service (PresS) functionality may be integrated into the group communication service (GCS) functionality. Typically, the presence service may be regarded as a home environment service or a home environment value added service provider service, wherein the home environment manages the presence information of users' devices, services and service media, even when roaming. The presence information is a set of attributes characterizing current properties of presence information providers, such as the status or an optional communication address. Examples of a presence service are disclosed for example in version 1.1 specifications for presence attributes, features and functions and system architecture model of the Wireless Village initiative or provided by wireless AOL® Instant Messenger™ (AIM) service or Enterprise AIM® service. The Wireless Village initiative is a program of the IEEE Industry Standards and Technology Organization (IEEE-ISTO). Wireless Village joined Open Mobile Alliance(OMA), and the Wireless Village work and specifications are currently continued by the OMA IMPS working group.

The presence service functionality is only an exemplary functionality illustrating herein all possible service functionalities providing information on group members. Another example is a service providing location information.

Figure 2:
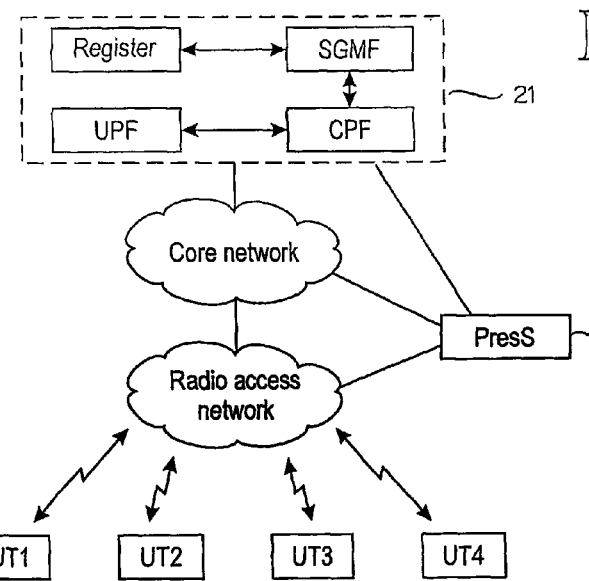
FIG. 2 illustrates a server-based group communication system.

FIG. 2 illustrates an example where a packet mode group communication service is embodied with a server-based group communication system 21 having different control-plane and user-plane logical entities serving the subscribers. The basics of this concept and examples of the architecture and different implementations are illustrated in more detail in the co-pending U.S. patent application Ser. Nos. 09/835,867; 09/903,871; 10/160,272; and 09/903,871; and in the PCT application WO 02/085051, which are incorporated herein by reference. The subscriber transmissions are proxied and forwarded by these server entities, which do not allow direct end-to-end transmissions between the subscribers. It should be appreciated that control-plane functions (CPF) and user-plane functions may also be within the underlying communication network(s), providing a top protocol layer for the communication network. The underlying mobile communication system may be, for example, a second generation (2G) packet radio system, such as GSM/GPRS, providing the IP packet data service. Particularly in the third generation (3G) mobile system, the public land mobile network (PLMN) infrastructure may be logically divided into core network (CN) and access network (AN) infrastructures. The radio access network may be based on the second generation (2G), third generation (3G) or any other radio access technology. The radio access network RAN is called a base station subsystem (BSS) for the GSM, and a radio network subsystem (RNS) or radio access network (RAN) for the UMTS. Similarly, any communication system supporting packet mode communication can be employed instead of the mobile network infrastructure described above. It should be appreciated that the type of the underlying network layer (i.e. "the communication system") is not essential to the basic invention.

In FIG. 2, a packet based group communication system 21 is provided on top of the mobile network in order to provide group communication services to the user equipment or terminals UT through the communication system. The group communication system 21 may be embodied as a server system. Conceptually, the group communication server system may comprise control-plane functions CPF and user-plane functions providing packet mode server applications that communicate with the group communication client application(s) in the user terminals UT over the IP connections provided by the communication system. This communication includes signalling packets and voice or data communication packets. The CPF function is responsible for control-plane management of the group communication. This may include, for example, managing the user activity and creation and deletion of logical user-plane connections with an appropriate control protocol, such as the session initiation protocol SIP. The user may also perform group attachment and group detachment with the CPF by using control signalling, e.g. the SIP protocol. CPF also carries out user registration and authentication.

The user-plane function(s) UPF is (/are) responsible for distribution of data or speech packets to the user terminals according to their group memberships and other settings. The UPF forwards traffic only between valid connections programmed by the CPF. In the case of speech communication, the communication may be based on the Voice over IP (VoIP) protocol, and/or Real-time Transport Protocol, RTP. It should be appreciated that the user plane operation relating to the data or speech traffic is not relevant to the present invention. However, the basic operation typically includes that all the data or speech packet traffic from a sending user is routed to the UPF, which then delivers the packet traffic to all receiving users in the group by using a suitable technique, such as multicasting or multiple unicasting (multi-unicast).

The group communication server system 21 may also include a subscriber and group management function (SGMF) for managing the subscriber and group data. It may also provide specific tools and interfaces needed for subscriber and group provisioning. Such tools or interfaces may include a WWW based control interface accessible by using a standard web browser. The SGMF may also have a database for storing the user and group information. The SGMF provides the information to the CPF when needed, for example during a group attachment. The system 21 may also include a register 22 for storing all provisioned data in the group communication system.

The presence server 22 is a server providing presence service functionality. The presence server fetches presence information, service capability information and/or location information from different external and internal sources, such as the core network providing communication services to the user, or from the group communication system 21 by using, for example, SMCNP (Server to Mobile Core Network Protocol) with the core network and SSP (Server to Server Protocol) with the group communication system, or by using Presence server open API based on Web Services Interface, WSI (open API for applications and services). In PoC solutions, WSI may be preferably used rather than SSP between PS and PoC. Also other existing or future interfaces (protocols) could be used for exchanging information between the presence server and GCS.

Presence server 22 can also be used for authentication and authorization of users, i.e. user equipment or terminals, clients and servers. Presence server 22 may also obtain location information of location services. For example, the GPRS core network contains a standard circuit-core-based location service having the serving mobile location centre (SMLC) and the gateway mobile location centre (GMLC) entities. Thus, the presence server 22 may get the location of the users via the GMLC, for example. Another possibility is to fetch the location information from the group communication system 21.

The location information can be directly pushed to the presence server 22 and/or to the group communication system 21 time to time by the location service, or the presence server 22 can fetch the location from the location service. The fetching can be done time to time or when the location information is actually needed. If the mobile communication network cannot provide the location information, as might be the case with the TETRA system, other location information technologies [such as the GPS (global positioning system)] can be utilized.

A user device UT may be a wireless device, such as mobile user equipment, or it may be a device connected by a fixed connection, such as a dispatcher station. Herein the term 'user terminal' and the corresponding acronym RTP are used to refer to any device or user equipment allowing the user to access network services.

As an exemplary embodiment, the user terminal UT, such as a mobile station MS, may have a PoC application on a user layer on top of the standard protocol stack used in the specific mobile communications system. An appropriate session control protocol, such as the Session Initiation Protocol (SIP), may be used for the PoC control plane signaling. The voice communication may be based on IP communication (such as voice over IP, VoIP), and RTP (Real-time Transport Protocol, defined in RFC1889) may be employed to handle the voice packet (VoIP) delivery in the user plane. The SIP and RTP protocols employ the underlying Transmission Control Protocol (TCP), User Datagram Protocol (UDP) and IP protocols that further employ the physical layer resources, such as the radio resources. For example, the underlying connection in a mobile communication network may be based on a GPRS connection. Additionally, a WAP stack may be employed to access the WAP pages on SGMF or on another server.

Figure 3:
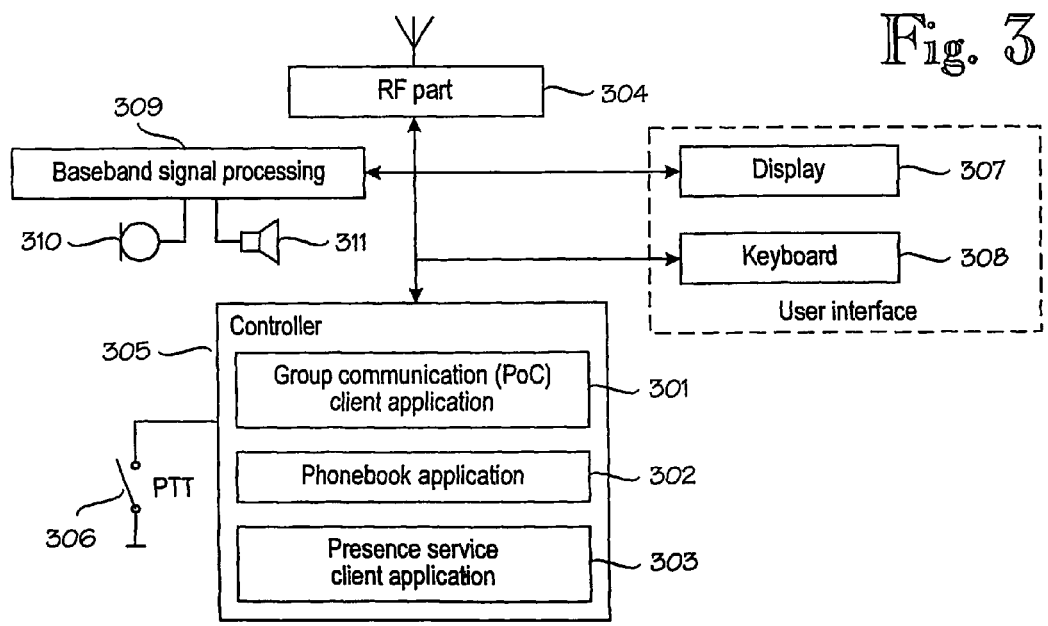
FIG. 3 is a block diagram of an exemplary user terminal UT according an embodiment of the invention.

An example of a possible implementation of a subscriber device UT is illustrated in a simplified block diagram shown in FIG. 3. An RF part 304 represents any radio frequency function and hardware required by a specific air interface employed. The actual implementation of the RF part 304 is not relevant to the present invention. A baseband signal processing 302 represents any baseband signal processing required in any specific implementation, such as an analog-digital (A/D) conversion of the analogue speech signal from the microphone 310, vo-encoding, IP packet building, frame building, deframing, IP packet debuilding, vo-decoding, a digital-analog (D/A) conversion of the 10 received digital speech signal into an analog signal applied to a loudspeaker 311. A controller 305 controls operation of the RF unit 304 and the baseband signal-processing unit 309. The controller 305 controls the signaling, both out-band (SIP) and embedded, as well as IP packet building and debuilding. Start and stop of the speech items are set by a PTT switch 306, which can be replaced by any user-operated device, e.g. a voice activity detector (VAD). Such alternative mechanisms for starting and ending a speech item instead of the PTT are obvious to a person skilled in the art. A user interface may include a display 307 and a keyboard 308. It should be appreciated that the blocks illustrated in FIG. 3 are functional blocks that can be implemented in a variety of different circuit configurations. For example, the baseband processing and the controller may be implemented in a single programmable unit (e.g. a CPU or a signal processor) or in a plurality of units. The operation according to the present invention is primarily related to the controller part of the MS, and the basic invention may be implemented as program modifications in the control program of the MS, for example. It should also be appreciated that the present invention is not intended to be restricted to mobile stations and mobile systems but the terminal can be any terminal having a speech communication capability. For example, the user terminal may be a terminal (such as a personal computer PC) having Internet access and a VoIP capability for voice communication over the Internet.

In the embodiment of FIG. 3, the controller 305 comprises a group communication client application 301 and a phonebook application 302, and optionally a presence service client application 303. These applications may be at least partly integrated. For example, a phonebook application 302 and optionally a presence service client application 303 may be embodied by a presence-enhanced phonebook.

The group communication client application 301 (e.g. POC client) provides the group communication service. The group communication client application 301 maintains group information, such as group identification information and group membership information. The group communication client 3-1 provides tools for group creation, for attaching to (joining) a group and for detaching from (leaving) the group, starting and ending the speech items, etc.

The presence service client application 303 is an example of information service application that may optionally be provided in the device for the service. The presence service client may be arranged to update presence information of the UT to the presence server in response to changes in the presence information without any request by the user of the UT. For example, the presence information may be updated in response to location update, selecting a silent/loud mode, activating/deactivating a group, connecting/removing a headset etc. Examples of presence information include group member location, group member availability (available, busy, etc.), or group member terminal status (in a call, data services on, in a group call, idle, etc.). The presence server client application 303 may also be arranged to receive presence information on other users on the basis of what the user of the UT has subscribed.

The phonebook application 302 provides the user with a tool for maintaining and managing contact information, such as telephone numbers, names, addresses, presence information, etc. of desired individuals or groups. The phonebook application 302 interacts with the user via the user interface, i.e. the phonebook application 302 generates various screens on the display 307 and receives user inputs (e.g. commands, selections, etc.) via the keyboard or other input means. The phonebook application 302 also interacts with the group communication client application 301 and the presence service client application for interchanging information and commands.

Figure 4A:
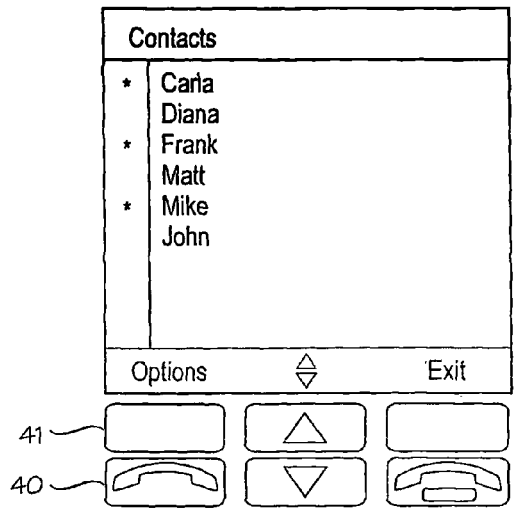
FIGS. 4A, 4B and 4C show an example of screen views of a phonebook application.
Figure 4B:
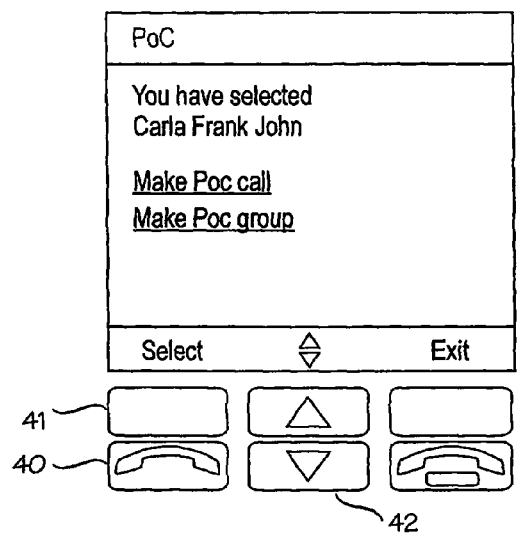
Figure 4C:
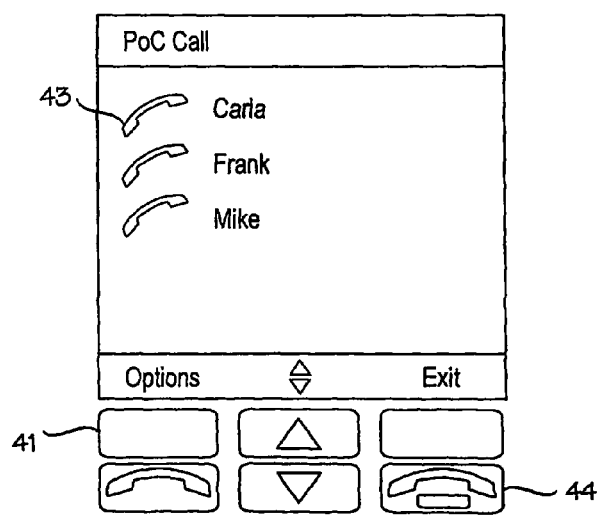

FIGS. 4A, 4B and 4C show an example of screen views of the phonebook application 302 when making an ad-hoc group call in accordance with the invention. The user wishing to initiate a group call opens the phonebook application 302 (step 501 in FIG. 5). As a result, a contact list of the phonebook is displayed, as illustrated in FIG. 4A. It should be appreciated that the user may use this phonebook screen for any conventional phonebook operations (step 504 in FIG. 5). For example, the user can select an individual contact and make a one-to-one call by pressing an "off-hook" key 40. Still further, one or more of the contacts may be predefined groups so that the user may be able to select such a group and make a group call by pressing the "off-hook" key 40. The present invention, however, concentrates on making ad-hoc calls. Typical characteristics of ad-hoc (spontaneously defined) groups include: 1) They are dynamic by nature. Usually the existence of the group is limited to the duration of the group call. 2) They are formed on the need basis, e.g. arranging a meeting with three colleagues. 3) The group members participating in the group are not pre-defined but the group consists of people selected based on the subject/need of the call, and optionally, on the presence information of the people to be part of the group call, e.g. user availability, context, location or terminal status.

The user selects from the phonebook screen the people with whom he/she wants to make an ad-hoc group call. In this example, the contacts "Carla", "Frank" and "Mike" are selected. Then the user presses the "Options" key 41 (step 502 in FIG. 5). In an alternative embodiment, the user may alternatively press the "Off-hook" key 40 in order to directly start an ad-hoc group call with the selected contacts.

Figure 5:
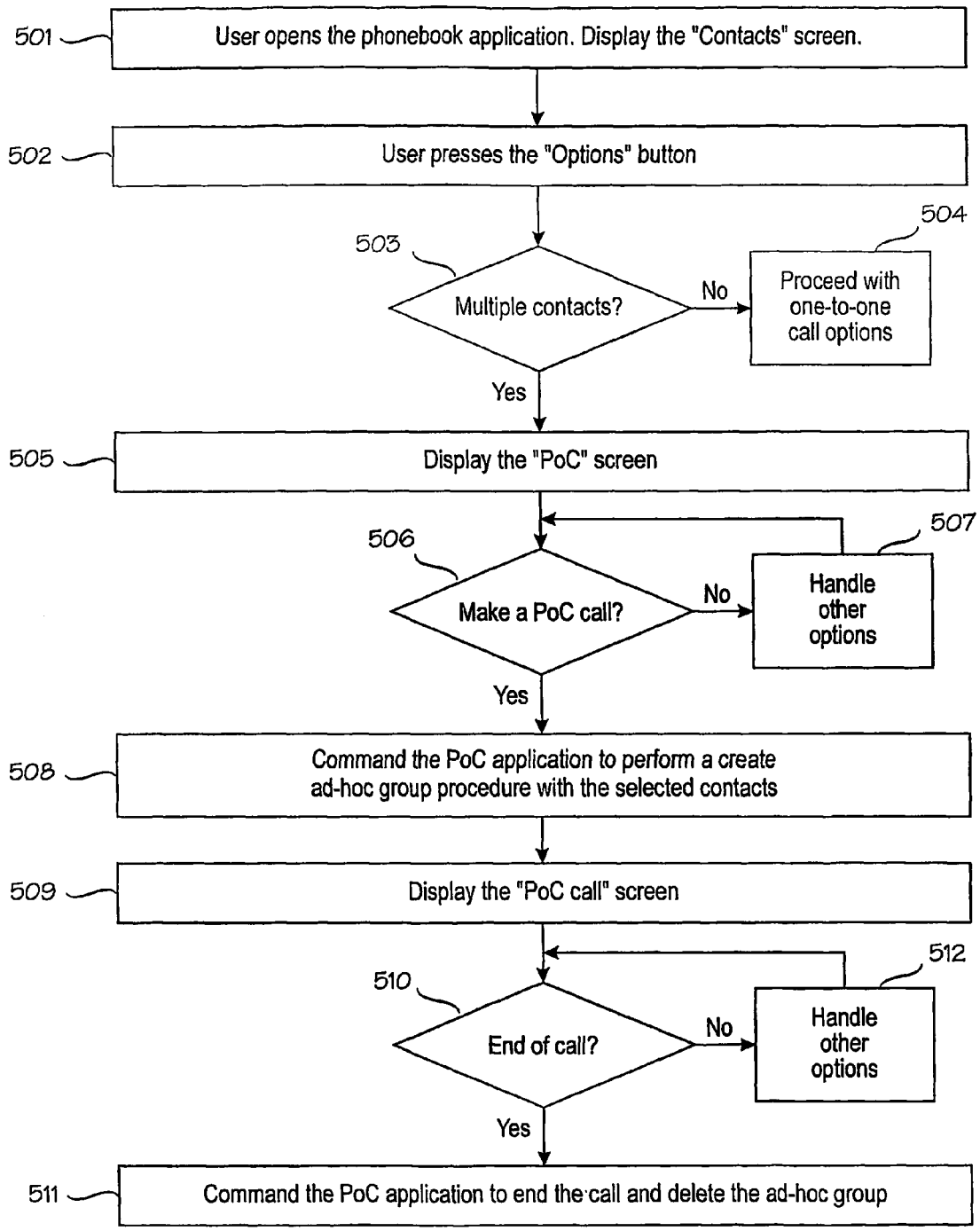
FIG. 5 is a flow diagram illustrating an example of operation of a user terminal according to an embodiment of the invention.

The phonebook application 302 detects the activation of the "Options" key 41 and observes that the user has selected multiple contacts (step 503 in FIG. 5). As a consequence, the phonebook application 302 displays a group communication menu screen (step 505 in FIG. 5), an example of which is shown in FIG. 4B. This screen contains one or more group communication operations to be selected, and optionally the selected contacts. In the example shown in FIG. 4B, the PoC operations "Make PoC call" and "Make PoC group" are displayed. The user can select the desired operation by means of the arrow keys 42 and the "Select" key 41. Optionally, the user may select the "Make PoC call" operation directly by pressing the "Off-hook" key 40.

When the phonebook application 302 detects that the user has selected the "Make PoC call" operation either by pressing the "Off-hook" key 40 on the screen shown in FIG. 4A, or by pressing the "Select" key 41 or the "Off-hook" key 40 on the screen shown in FIG. 4B, it initiates a PoC group call.

Figure 6:
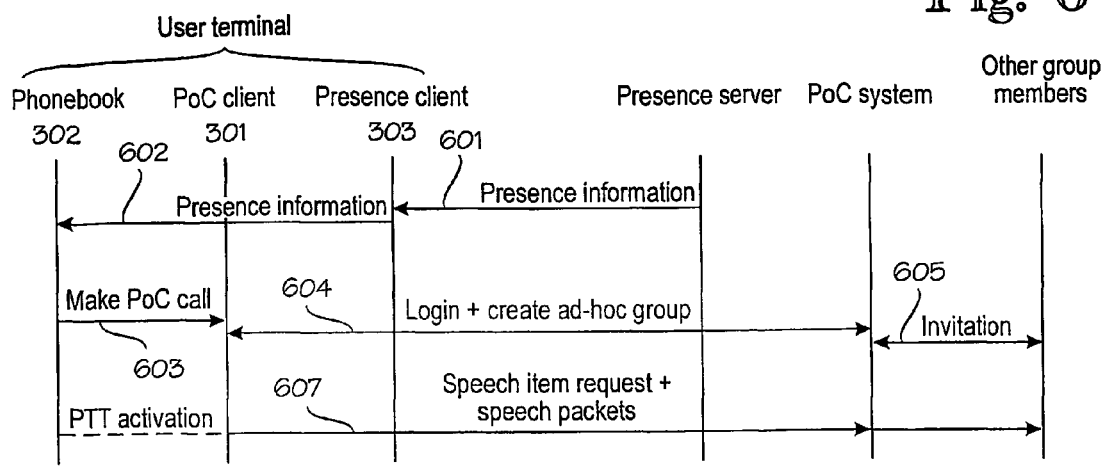
FIG. 6 is a signaling diagram illustrating an example of communication between different entities in a communication system.

More particularly, when the phonebook application 302 detects that the user has selected the "Make PoC call" operation (step 506 in Figure), the phonebook application 302 may command the group communication client application 301 to login to the group communications service 21 and to create an ad-hoc group containing the selected contacts and the initiating user (step 508 in FIG. 5; step 603 in FIG. 6). The group communication client application 301 performs the login and the ad-hoc group creation using an appropriate protocol, such as the SIP in the PoC system (step 604 in FIG. 6). However, the user terminal may optionally operate in the "always-on" mode, where the connection to the group communications system 21 is always on and the login is needed only once, for example when the power is switched on in the terminal. Thus, when the user is already logged in the group communications service 21, only the ad-hoc group creation is required. In the example shown the group communication client application 301 sends a PoC group attach message indicating that the user joins a new ad-hoc group containing also the contacts "Carla", "Frank" and "Mike". The group communication system 21 receives the PoC group attach message and forms an ad-hoc group containing the members indicated in the message. Then the group communication system 21 contacts the group communication client applications in terminals of these group members "Carla", "Frank" and "Mike" in order to let the users receive the call, i.e. it sends a group invitation (step 605 in FIG. 6). The group communication system may contact the group members by using, for example, a smart message (e.g. short message-based), a WAP PUSH specified message, or via a packet data connection (e.g. GPRS) in the case the group communication client application of the group member has a PDP context open. In the latter case, the message may be a SIP group invitation message. Then the group communication system 21 establishes user-plane (e.g. VoIP/RTP) communication between the group members.

The group communication may be controlled by means of a push-to-talk (PTT) button in the terminal. The PTT may be a separate button or one of the normal buttons in the keyboard.

The PTT may also be implemented with a voice activity detector (VAD). In any case, the activation of the PTT starts a speech item (steps 606 and 607 in FIG. 6). The group communication may be in accordance with the co-pending applications mentioned above. For example, the CPF of each group member programs the respective UPF to forward traffic, such as VoIP and/or RTP packets.

In an embodiment of the invention the "Make a call" or "Off-hook" selection starts the formation of the ad-hoc group in the group communication system but the actual ad-hoc group call (i.e. the user plane operation) is not started until the PTT is activated by one of the group members.

During the group call, the phonebook application 302 may display a "PoC call" screen (step 509 in FIG. 5), e.g. the screen illustrated in FIG. 4C. In this example the screen indicates that the PoC group call is going on, and the members of the group call and optionally the call status 43 of a group member, i.e. also inactive (off-hook) group members may be shown. Thus the user will know if a group member leaves or joins the call. The user may select further group operations by pressing the "Options" key. One of the options may be "Leave group call" operation. The user may also end/leave the group call by pressing an "on-hook" key 44. When the phonebook application 302 detects "end-of-call" input from the user, it may command the PoC application to end the call and delete the ad-hoc group (steps 510 and 511 in FIG. 5), for example. If the user selects other options, these options are handled (step 512 in FIG. 5).

The ad-hoc group can be deleted based on one or more different rules, in the terminal UT and/or in the group communication service. These rules may be established as part of the implementation in the group communication client application in the terminal and/or the group server in the infrastructure. Examples of the rules Include deleting the group when the initiator leaves the group call, deleting the group when all group members leave the group call, or deleting the group after a certain idle time without any speech traffic.

Figure 7:
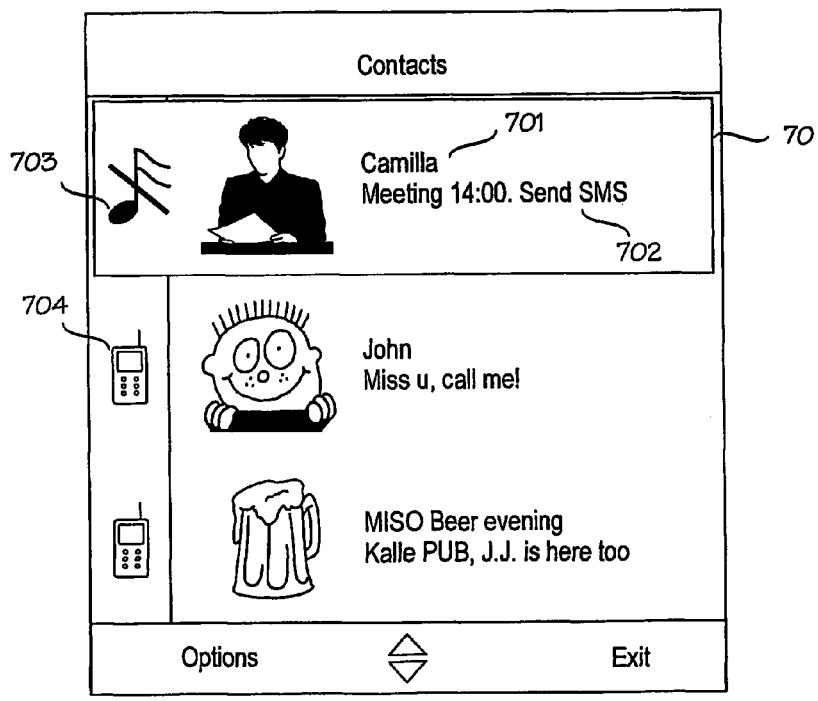
FIG. 7 illustrates a further example of a screen according to an embodiment of the invention.

In an embodiment of the invention, a presence service is utilized in the phonebook. In other words, the phonebook application 302 obtains presence information from the presence service client application 303 regarding the other group members, such as user availability, context, location or terminal status (step 602 in FIG. 6). The presence client application 601 may obtain the presence information from a presence server (step 601), for example in a manner defined for OMA IMPS formerly known as Wireless Village. Thus, the presence enhanced phonebook enables the user to know at any time the presence information of the contacts stored in the phonebook, and more significantly, of the people with whom he/she wants to have an ad-hoc group call. As a consequence, the likelihood of failed group calls can be reduced. An example of the "Contacts" screen of the phonebook with the presence information is shown in FIG. 7. Each contact or contact card 70 may include several pieces of information. A "name" field 701 indicates the name of the contact. A "text" field 702 may include presence information and/or a message, for example. A "status" field 703/704 may indicate the status of the contact's terminal. In FIG. 7, the status field 703 indicates that/whether the ringing tone of the contact's terminal is switched off (silent mode), and the status field 704 indicates that the contact's terminal is ready to receive calls. It should be appreciated that the status field may include any information instead of or in addition to name, text, status and logo. Such information may include location, time zone, terminal capability, terminal status, e.g. in a PoC call, in a normal call, etc.

The description only illustrates some embodiments of the invention. The invention is not, however, limited to these examples, but it may vary within the scope and spirit of the appended claims.

The invention claimed is:

1. A method, comprising:
specifying, by way of a user selection via a phonebook application resident on a user device, one or more subscribers from a list stored on the user device;
initiating establishment of an ad-hoc group call with the user device and one or more subscriber devices associated with the one or more subscribers;
determining to store presence information of the subscribers in the phonebook application;
determining to store the user selection of the subscribers in the phonebook application; and
deleting the user selection of the one or more subscribers from the phonebook application when the ad-hoc group call ends.

2. A method of claim 1, further comprising:
causing, at least in part, transmission of a request for the ad-hoc group call to a group communication service via a network for signaling the one or more subscribers.

3. A method of claim 2, further comprising:
causing, at least in part, transmission of a media item, a media item request, or a combination thereof to the group communication service each time a talk activity is detected or indicated at the user device, the one or more subscriber devices, or a combination thereof during the ad hoc group call.

4. A method of claim 3, wherein the media item, the media item request, or the combination thereof is transmitted based, at least in part, on one or more settings defined in user plane functions.

5. A method of claim 1, further comprising:
causing, at least in part, rendering at the user device a presentation of a group communications menu based, at least in part, on the one or more subscribers; and
receiving another user selection of one or more operation options in the group communications menu for establishing the ad-hoc group call.

6. A method of claim 1, further comprising:
receiving another user selection of a predetermined button for establishing the ad-hoc group call without further user intervention.

7. A method of claim 1, wherein the ad-hoc group call includes data communication, audio communication, video communication, multimedia communication, messaging, or a combination thereof 8. A method of claim 1, further comprising:
causing, at least in part, rendering a list of the one or more subscribers and the presence information of the one or more subscribers at the user device.

9. A method of claim 8, wherein the presentation further includes a subject of the ad-hoc group call, context, a location, a time zone, a user device status, or a combination thereof.

10. An apparatus comprising:
at least one processor; and
at least one memory including computer program code for one or more programs,
the at least one memory and the computer program code configured to, with the at least one processor, cause the apparatus to perform at least the following,
specify, by way of a user selection via a phonebook application resident on a user device, one or more subscribers from a list stored on the user device;

initiate establishment of an ad-hoc group call with the user device and one or more subscriber devices associated with the one or more subscribers; and determine to store presence information of the subscribers in the phonebook application;

determine to store the user selection of the subscribers in the phonebook application; and delete the user selection of the one or more subscribers from the phonebook application when the ad-hoc group call ends.

11. An apparatus of claim 10, wherein the apparatus is further caused to:

cause, at least in part, transmission of a request for the ad-hoc group call to a group communication service via a network for signaling the one or more subscribers.

12. An apparatus of claim 10, wherein the apparatus is further caused to:

cause, at least in part, transmission of a media item, a media item request, or a combination thereof to the group communication service each time a talk activity is detected or indicated at the user device, the one or more subscriber devices, or a combination thereof during the ad hoc group call.

13. An apparatus of claim 12, wherein the media item, the media item request, or the combination thereof is transmitted based, at least in part, on one or more settings defined in user plane functions.

14. An apparatus of claim 10, wherein the apparatus is further caused to:

cause, at least in part, rendering at the user device a presentation of a group communications menu based, at least in part, on the one or more subscribers; and receive another user selection of one or more operation options in the group communications menu for establishing the ad-hoc group call.

15. An apparatus of claim 10, wherein the apparatus is further caused to:

receive another user selection of a predetermined button for establishing the ad-hoc group call without further user intervention.

16. A non-transitory computer-readable storage medium carrying one or more sequences of one or more instructions which, when executed by one or more processors, cause an apparatus to at least perform the following steps:

specifying, by way of a user selection via a phonebook application resident on a user device, one or more subscribers from a list stored on the user device;

initiating establishment of an ad-hoc group call with the user device and one or more subscriber devices associated with the one or more subscribers; and determining to store presence information of the subscribers in the phonebook application;

determining to store the user selection of the subscribers in the phonebook application; and deleting the user selection of the one or more subscribers from the phonebook application when the ad-hoc group call ends.

17. A non-transitory computer-readable storage medium of claim 16, wherein the apparatus is caused to further perform:

causing, at least in part, transmission of a request for the ad-hoc group call to a group communication service via a network for signaling the one or more subscribers.

* * * * *